US009794614B2

(12) United States Patent  
Holmquist et al.

(10) Patent No.: US 9,794,614 B2  
(45) Date of Patent: *Oct. 17, 2017

(54) SECURE INFORMATION EXCHANGE BETWEEN DEVICES USING LOCATION AND UNIQUE CODES

(71) Applicant: Excalibur IP, LLC, Sunnyvale, CA (US)

(72) Inventors: Lars Erik Holmquist, San Francisco, CA (US); Yash Dayal, Bangalore (IN)

(73) Assignee: Excalibur IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,507

(22) Filed: Dec. 31, 2015

(65) Prior Publication Data

US 2016/0112749 A1   Apr. 21, 2016

Related U.S. Application Data

(63) Continuation of application No. 14/248,311, filed on Apr. 8, 2014, now Pat. No. 9,282,358.

(51) Int. Cl.
*H04N 21/431* (2011.01)
*H04N 21/426* (2011.01)
(Continued)

(52) U.S. Cl.
CPC ... *H04N 21/42684* (2013.01); *H04N 21/2396* (2013.01); *H04N 21/25833* (2013.01);
(Continued)

(58) Field of Classification Search
CPC ......... H04N 21/42684; H04N 21/4312; H04N 21/4524; H04N 21/4126; H04N 21/25833;
(Continued)

(56) References Cited

U.S. PATENT DOCUMENTS 9,094,730 B1 * 7/2015 Kirmse ............. H04N 21/4826
2010/0169817 A1 * 7/2010 Want ................. G06F 3/04817
715/772

(Continued)

*Primary Examiner* — Pinkal R Chokshi
(74) *Attorney, Agent, or Firm* — Martine Penilla Group, LLP (57) ABSTRACT

Software receives a communication from a smart-television device. The communication includes a device identifier for the smart-television device and a geo-location for the smart-television device. The geo-location results from collaborative location detection that uses stored geo-positions previously received from one or more mobile devices positioned proximate to the smart-television device. The software causes the smart-television device to display a first view that includes a visual icon and a message identifying a connected-television service. The software receives a geo-position for a mobile device. Upon determining that the geo-location of the smart-television device is proximate to the geo-position of the mobile device, the software causes the mobile device to display a second view that includes the visual icon. The software receives a communication from the mobile device that indicates a match between the visual icon in the first view and the visual icon in the second view and connects the devices.

20 Claims, 7 Drawing Sheets

(51) Int. Cl.
*H04N 21/45* (2011.01)
*H04N 21/41* (2011.01)
*H04N 21/239* (2011.01)
*H04N 21/258* (2011.01)
*H04N 21/643* (2011.01)
*H04N 21/8352* (2011.01)

(52) U.S. Cl.
CPC ... *H04N 21/25841* (2013.01); *H04N 21/4126* (2013.01); *H04N 21/4312* (2013.01); *H04N 21/4524* (2013.01); *H04N 21/64322* (2013.01); *H04N 21/8352* (2013.01)

(58) Field of Classification Search
CPC ....... H04N 21/25841; H04N 21/64322; H04N 21/43615
See application file for complete search history.

(56) References Cited

U.S. PATENT DOCUMENTS

| | | | | |
|---|---|---|---|---|
| 2010/0205628 A1* | 8/2010 | Davis | ................ | H04M 1/72533 725/25 |
| 2011/0302300 A1* | 12/2011 | Kikkawa | ............. | H04L 12/2809 709/224 |
| 2011/0313775 A1* | 12/2011 | Laligand | ........ | H04N 21/234336 704/275 |
| 2012/0243469 A1* | 9/2012 | Klein | ................... | H04L 12/282 370/328 |
| 2012/0278736 A1* | 11/2012 | Tran | ..................... | H04N 21/252 715/753 |
| 2013/0176415 A1* | 7/2013 | Kim | ................... | H04N 5/23219 348/78 |
| 2013/0318158 A1* | 11/2013 | Teng | ....................... | H04L 67/42 709/203 |
| 2014/0067828 A1* | 3/2014 | Archibong | .......... | H04L 65/4084 707/748 |
| 2014/0105561 A1* | 4/2014 | Chen | ................... | H04N 21/647 386/200 |
| 2014/0118625 A1* | 5/2014 | Cho | ................... | H04N 5/44513 348/734 |
| 2014/0123190 A1* | 5/2014 | Song | ................... | H04N 21/482 725/40 |
| 2014/0259047 A1* | 9/2014 | Bakar | ................ | H04N 21/6371 725/30 |
| 2014/0379798 A1* | 12/2014 | Bunner | ................... | H04L 67/24 709/204 |
| 2015/0067736 A1* | 3/2015 | Whitten | ............... | H04N 21/458 725/46 |
| 2015/0161477 A1* | 6/2015 | Kashyap | .......... | H04N 21/41407 382/181 |

* cited by examiner

SECURE INFORMATION EXCHANGE BETWEEN DEVICES USING LOCATION AND UNIQUE CODES

RELATED APPLICATION

This application is a continuation application of U.S. patent application Ser. No. 14/248,311, filed on Apr. 8, 2014, also entitled "Secure Information Exchange Between Devices Using Location and Unique Codes". The disclosure of that earlier application is incorporated by reference herein for all purposes.

BACKGROUND

Online connected-television services, such as Yahoo! Connected TV and Google TV, integrate online services with audiovisual content streamed and/or downloaded by smart-television devices such as set-top boxes or digital media players such as Google Chromecast.

However, users of mobile devices such as smartphones find it cumbersome to logon to such online services and/or smart-television devices, using full-blown password authentication. And low login rates for these services keep them from generating user histories (including user viewing data) that are useful for generating revenue from targeted advertising and promotions.

SUMMARY

In an example embodiment, a processor-executed method is described. According to the method, software on servers at a website receives a communication over a network from a smart-television device. The communication includes a device identifier, which is unique, for the smart-television device and a geo-location associated with the smart-television device. The software generates a visual icon for the device identifier. The visual icon is unique with respect to other smart-television devices at the geo-location. The software then causes the smart-television device to display a first view that includes the visual icon along with a message identifying a connected-television service. The software receives a request over a network from a mobile device to connect to the connected-television service. The request results in transmission of a geo-position from the mobile device. Then upon determining that the geo-position of the smart-television device is proximate to the geo-location of the mobile device, the software causes the mobile device to display a second view that includes the visual icon for the device identifier and any other visual icons associated with the geo-location that have been generated. The software receives a communication over a network from the mobile device that indicates a match between the visual icon for the device identifier in the first view and the visual icon for the device identifier in the second view. The communication also includes a user identifier obtained from the mobile device or a user of the mobile device. Then the software causes the smart-television device to display the user identifier in a third view with a message indicating connection to the smart-television device and/or connected-television service.

In another example embodiment, an apparatus is described, namely, computer-readable media which persistently store a program that runs on servers at a website. The program receives a communication over a network from a smart-television device. The communication includes a device identifier, which is unique, for the smart-television device and a geo-location associated with the smart-television device. The program generates a visual icon for the device identifier. The visual icon is unique with respect to other smart-television devices at the geo-location. The program then causes the smart-television device to display a first view that includes the visual icon along with a message identifying a connected-television service. The program receives a request over a network from a mobile device to connect to the connected-television service. The request results in transmission of a geo-position from the mobile device. Then upon determining that the geo-position of the smart-television device is proximate to the geo-location of the mobile device, the program causes the mobile device to display a second view that includes the visual icon for the device identifier and any other visual icons associated with the geo-location that have been generated. The program receives a communication over a network from the mobile device that indicates a match between the visual icon for the device identifier in the first view and the visual icon for the device identifier in the second view. The communication also includes a user identifier obtained from the mobile device or a user of the mobile device. Then the program causes the smart-television device to display the user identifier in a third view with a message indicating connection to the smart-television device and/or connected-television service.

Another example embodiment also involves a processor-executed method. According to the method, software on servers at a website receives a communication over a network from a smart-television device. The communication includes a device identifier that is provided by a manufacturer of the smart-television device and a geo-location associated with the smart-television device. The software generates a visual icon for the device identifier. The visual icon is unique with respect to other smart-television devices at the geo-location. The software then causes the smart-television device to display a first view that includes the visual icon along with a message identifying a connected-television service. The software receives a request over a network from a mobile device to connect to the connected-television service. The request is made using the Hypertext Transfer Protocol (HTTP) and results in transmission of a geo-position from the mobile device. Then upon determining that the geo-position of the smart-television device is proximate to the geo-location of the mobile device, the software causes the mobile device to display a second view that includes the visual icon for the device identifier and any other visual icons associated with the geo-location that have been generated. The software receives a communication over a network from the mobile device that indicates a match between the visual icon for the device identifier in the first view and the visual icon for the device identifier in the second view. The communication also includes a user identifier obtained from the mobile device or a user of the mobile device. Then the software causes the smart-television device to display the user identifier in a third view with a message indicating connection to the smart-television device and/or connected-television service.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
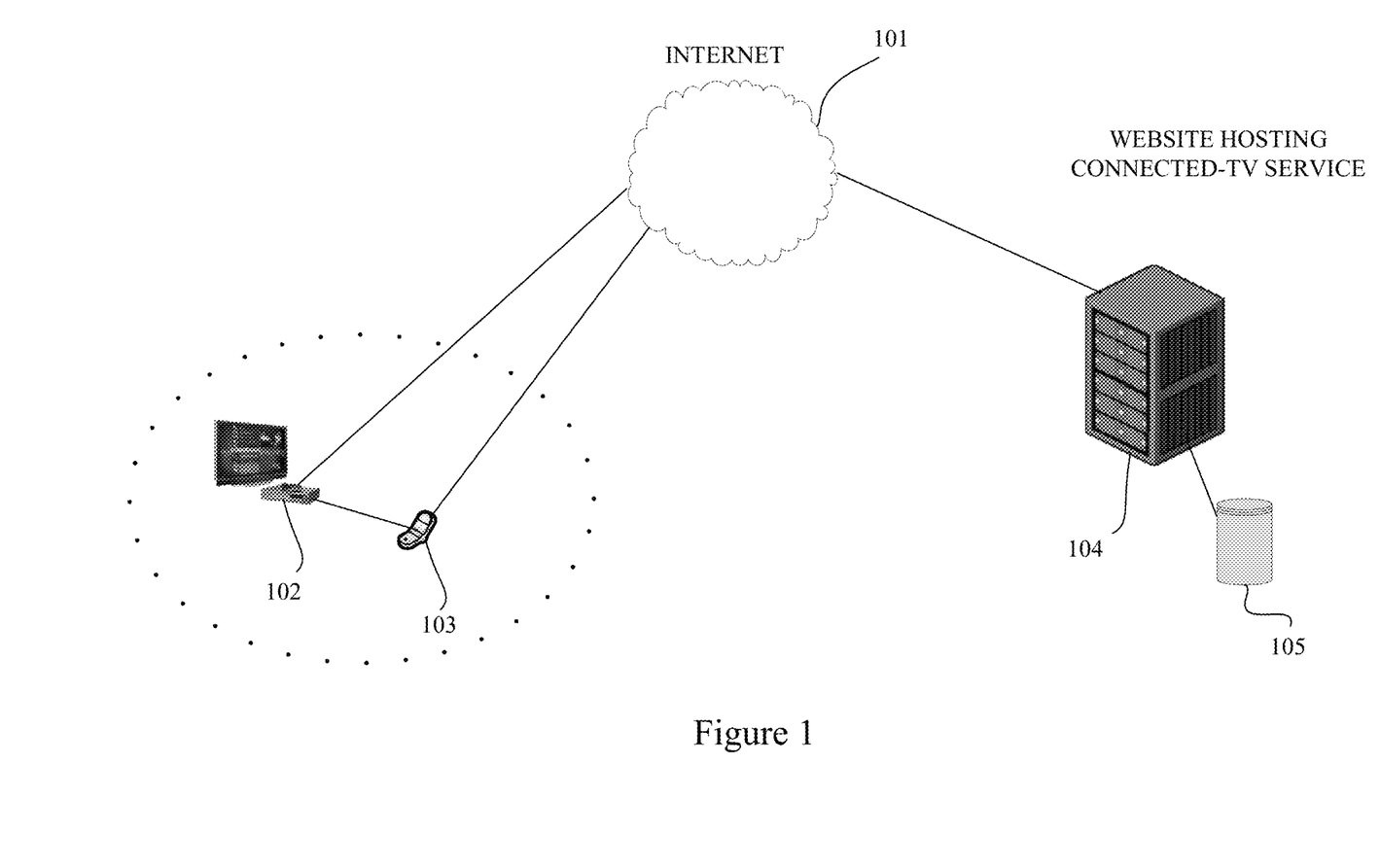
FIG. 1 is a network diagram showing a network connecting a smart-television device, a mobile device, and a website hosting a connected-television service, in accordance with an example embodiment.

FIG. 1 is a network diagram showing a network connecting a smart-television device, a mobile device, and a website hosting a connected-television service, in accordance with an example embodiment. As depicted in this figure, a smart-television device 102 (e.g., a set-top box such as Comcast, Roku, or Amazon Fire TV, a digital-media player/streamer such as Google Chromecast or Apple TV, a Blu-ray player/streamer, a television with smart-television functionality, a digital video recorder such as Tivo, a gaming system such as Sony PlayStation, Microsoft Xbox, etc.) and a mobile device 103 (e.g., a smartphone such as an iPhone, Android, Windows Phone, etc., a tablet computer such as an iPad, Galaxy, a laptop, a wearable, etc.) are connected by a network 101 (e.g., a wide area network (WAN) including the Internet, which might be wireless in part or in whole): (a) to each other; and (b) to a website 104 hosting a connected-television service, e.g., Yahoo! Connected Television, Google TV, etc. As used in this disclosure, the term "connected-television service" is to be broadly construed to include any online service that (1) supports the reception, streaming, downloading, and/or playing of content (e.g., text, including hyperlinks, images, videos, audio recordings, executables such as games, etc.), including audiovisual content that is streaming and/or downloadable, e.g., from online content providers such as Netflix, Amazon, and Hulu and/or from digital television providers (e.g., wired and/or wireless) such as ABC, NBC, CBS, Comcast, or DirecTV, or (2) supports online integration and/or interactivity with respect to such streaming and/or downloadable content, including online integration and/or interactivity with respect to the promotion, advertising, branding, and/or marketing of goods and services.

In an example embodiment, website 104 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Dremel, CloudBase, etc. The servers in website 104 might be connected to persistent storage 105. Persistent storage 105 might include flash memory, a redundant array of independent disks (RAID), and/or a storage area network (SAN), in an example embodiment. In an alternative example embodiment, the servers in website 104 and/or the persistent storage in persistent storage 105 might be hosted wholly or partially in a public and/or private cloud, e.g., where the cloud resources serve as a platform-as-a-service (PaaS) or an infrastructure-as-a-service (IaaS).

Persistent storage 105 might be used to store data related to content (e.g., text, including hyperlinks, images, videos, audio recordings, etc.) and data related to users, their social contacts (e.g., Facebook friends), and/or their devices (e.g., their smart-television devices and/or their mobile devices), as well as software (e.g., scripts, apps, etc.) including algorithms and other processes for presenting the content to the users and/or their social contacts. In an example embodiment, some of the data related to content and/or some of the software stored in persistent storage 105 might have been received from a content delivery or distribution network (CDN), e.g., Akamai Technologies. Or, alternatively, some of the data related to content and/or some of the software might be delivered directly from the CDN to smart-television device 102 or to mobile device 103, without being stored in persistent storage 105.

The servers at websites 104 might include (1) hardware consisting of one or more microprocessors (e.g., from the x86 family, the ARM family, or the PowerPC family, Intel Edison), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, smart-TV device 102 and mobile device 103 might include (1) hardware consisting of one or more microprocessors and/or microcontrollers (e.g., from the ARM family or the x86 family), volatile storage (e.g., RAM), and persistent storage (e.g., flash memory such as microSD) and (2) an operating system (e.g., Android, iOS, Chrome OS, Windows Phone, Linux, Firefox OS, etc.) that runs on the hardware.

Also in an example embodiment, smart-television device 102 and mobile device 103 might each include a browser (e.g., an HTML5-compliant browser) as an application program or as part of an operating system. Examples of browsers that might execute on smart-television device 102 include Google Chrome, Android Browser, Internet Explorer, Mozilla Firefox, and Safari. It will be appreciated that users of smart-television device 102 and/or mobile device 103 might use browsers to access content and/or software provided by website 104. Alternatively, users of smart-television device 102 and/or mobile device 103 might use application programs (or apps) to access content and/or software delivered by website 104. In this regard, it will be appreciated that a connected-television service might include a store that distributes apps (or widgets) to smart-television device 102 and/or mobile device 103, e.g., voting apps, rating apps, etc.

Figure 2:
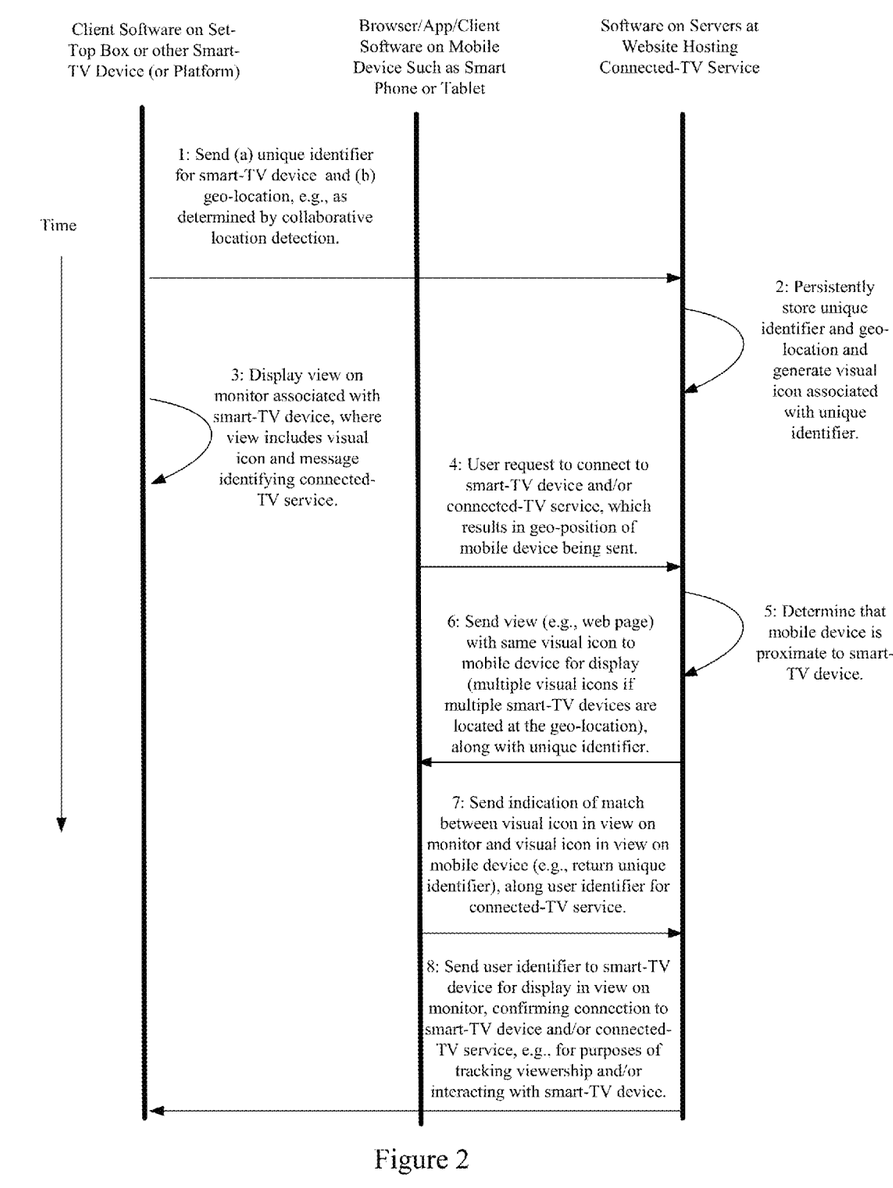
FIG. 2 is a sequence diagram showing a process for connecting a mobile device to a smart-television device, in accordance with an example embodiment.

FIG. 2 is a sequence diagram showing a process for connecting a mobile device to a smart-television device, in accordance with an example embodiment. As depicted in this figure, this process might be performed by software on three different hardware devices: (a) a smart-television device (or platform); (b) a mobile device (or platform); and (c) one or more servers at a website hosting a connected-television service. In the first operation (1) of the process, the software on the smart-television device (e.g., client software distributed by the connected-television service) sends (e.g., over a network) to the software on the servers at the website: (a) a unique identifier for the smart-television device; and (b) a geo-location (e.g., comprising longitude, latitude, and altitude) for the smart-television device, e.g., as determined using collaborative location detection based at least in part on stored geo-positions previously received from one or more connected (wirelessly or via cable) mobile (or other location-capable) devices positioned proximate to the smart-television device. In an example embodiment, the one or more mobile devices might, in turn, obtain (and store in volatile memory or persistent memory) its geo-position from a GPS system, Wi-Fi system, a cell-tower triangulation system, or a hybrid-positioning system associated with the mobile device and/or its networks. It will be appreciated that the smart-television device might be a relatively stationary (or non-mobile) device in comparison to a smartphone or other mobile device, e.g., due to the size and weight of the monitor or other display screen associated with the smart television device. Consequently, the smart-television device and/or its networks might not include or otherwise be associated with a global-positioning system (GPS), Wi-Fi system, cell-tower triangulation system, or a hybrid-positioning system like those used by mobile devices, in order to reduce costs, feature bloat, etc.

In an example embodiment, a process (e.g., an algorithm that is part of the software for the smart-television device) for collaborative location detection for a smart-television device might be initialized with the Internet Protocol (IP) address or cell-tower ID that the smart-television device uses for external network connectivity. When a mobile device is proximate and connects to the smart-television device, the smart-television device requests and receives the geo-position of the mobile device. Once multiple data points for geo-position have been received, the smart-television device computes a geo-location for itself (e.g., using a statistical measure of central tendency such as an average) that replaces the IP address or cell-tower ID. Over time, the computed geo-location will converge on the actual geo-location, if the smart-television device is not re-located (or moved). In an example embodiment, the smart television device might detect that it is re-located through a change in the IP address or cell-tower ID that the smart-television device uses for external network connectivity. Upon detecting re-location, the smart-television device might repeat the process, using the new IP address or cell-tower ID for initialization. For further details as to such collaborative location detection, see U.S. patent application Ser. No. 14/040,987, filed on Sep. 30, 2013, entitled "Method and System for Collaborative Location Detection", whose inventor is Lars Erik Holmquist, a co-inventor for this patent application. The disclosure of U.S. patent application Ser. No. 14/040,987 is incorporated by reference for all purposes.

In an example embodiment, the unique identifier might be an identifier provided by the manufacturer of the smart-television device. Also, in an example embodiment, the unique identifier might be provided by the manufacturer of the smart-television device and stored in persistent storage (e.g., firmware or a registry database) on the smart-television device.

In the next operation (2) of the process, software on the servers at the website persistently store (e.g., in a database) the unique identifier and geo-location received from the smart-television device. Then in operation (3), the software on the smart-television device displays a view on the monitor associated with the smart-television device. In an example embodiment, the view might include a visual icon (as depicted in subsequent figures) and a message identifying a connected-television service.

In operation (4), a user of a mobile device (e.g., a smartphone or tablet) requests (e.g., over the network) to connect to the smart-television device and/or connected-television service, in response to seeing the message on the smart-television device. In an example embodiment, the request (e.g., a request pursuant to the Hypertext Transfer Protocol or HTTP) might be initiated by the user touching a visual icon (e.g., a visual icon representing a shortcut or bookmark associated with the connected-television service) displayed in a view (e.g., a home screen) on the touch screen of the mobile device. The request might include (e.g., in the header or body of the request) the geo-position (e.g., comprising longitude, latitude, and altitude) of the mobile device, e.g., as retrieved by a browser plugin or other client software distributed by the connected-television service. In an example embodiment, the request might launch a browser with a web address (e.g., a uniform resource locator (URL)) for the website and software on the servers at the website might serve the browser a web page with a script (e.g., JavaScript, ActionScript, ECMAScript, etc.) that obtains the geo-position of the mobile device from the mobile device. Here again, in an example embodiment, the mobile device might, in turn, obtain (and store in volatile memory or persistent memory) its geo-position from a GPS system or a hybrid-positioning system associated with the mobile device and/or its networks.

In operation (5) of the process shown in FIG. 2, the software on the servers at the website determines that the mobile device is proximate to the smart-television device, e.g., the geo-position it received from the former device is within a specified distance, say approximately 5-30 feet, of the geo-location received from the latter device. It will be appreciated that this determination serves as a security safeguard, insofar as the proximate location of the devices is evidence that the user of the mobile device is in a position to see the views displayed by the smart-television device (which, as noted above, tends to be relatively stationary). Given this determination, the software on the servers at the website sends the unique identifier and a view (e.g., a web page) with the same visual icon to the mobile device for display, in operation (6). If there are multiple smart-television devices at the same geo-location (e.g., in different rooms of a house or different apartments in an apartment building), each of the smart-television devices might be associated with unique identifier and a unique visual icon, in an example embodiment. Consequently, in that event, the view (e.g., webpage) sent to the mobile device (along with multiple unique identifiers) might include multiple visual icons (as depicted in a subsequent figure), only one of which matches the visual icon displayed in the view on the monitor.

In operation (7), the user touches the visual icon in the view (e.g., web page displayed in a browser) on the mobile device's touch screen, to indicate that that visual icon matches the visual icon displayed in the view on the monitor. The software on the mobile device communicates this indication to the software on the servers at the website (e.g., by returning the unique identifier), along with the user's user identifier (e.g., username) with respect to the connected-television service. In an example embodiment, the user identifier might be retrieved using a browser plugin or web-page script that retrieves the user identifier from persistent storage on the mobile device. Or, if the user identifier has not been stored, the browser plugin or web-page script might obtain the user identifier from the user, e.g., through graphical user interface (GUI) dialogs. Then, in operation (8), the software on the servers at the website sends the user identifier to the smart-television device for display in a view on the monitor, confirming the users' connection (or login) to the smart-television device and/or connected-television service, e.g., for purposes of tracking viewership and/or interacting with the smart-television device (e.g., through a voting app).

In an example embodiment, the connection between the smart-television device and the mobile device might an interactive connection, which might be secure, using a protocol such as WebSocket. Also, in an example embodiment, the software running on the servers at the website might provide the information for such a connection to the smart-television device and the mobile device and let them set up the connection directly. In an example embodiment, the smart-television device might send the mobile device a coupon for a product and/or service being contemporaneously advertised on the monitor associated with the smart-television device. In another example embodiment, the connected-television service might send the mobile device a coupon for a product or service being contemporaneously advertised on the monitor associated with the smart-television device.

As described above in operations (6) and (7), the software on the servers at the website might send the unique identifier for the smart-television device to the software on the mobile device and then have it returned to the software on the servers, if there is a match between the visual icon displayed on the monitor and a visual icon displayed on the touch screen. In another example embodiment, these transmissions of the unique identifier might not occur. For example, the visual icons might have unique identifiers themselves which can be used to indicate a match between the visual icon displayed on the monitor and a visual icon displayed on the touch screen.

Similarly, in an alternative example embodiment, the unique identifier for the smart-television device might not be sent from the software running on the smart-television device. Instead, the unique identifier might be generated by the software running on the servers at the website.

As described above in operations (6) and (7), the user of the mobile device matches a visual icon displayed on the mobile device's touch screen to a visual icon displayed on a monitor. One might think of this matching as a lightweight form of image-based authentication. In other example embodiments, this matching might be replaced by other lightweight forms of image-based authentication, or by lightweight forms of gesture-based authentication, sound-based authentication, or hybrid authentication (e.g., using one or more image-based authentication, gesture-based authentication, or sound-based authentication). In this regard, it will be appreciated that the determination that the smart-television device is proximate to the mobile device provides a security safeguard, as noted above. That is to say, this determination provides evidence that the connected-television service is not being hacked from a remote location.

Figure 3:
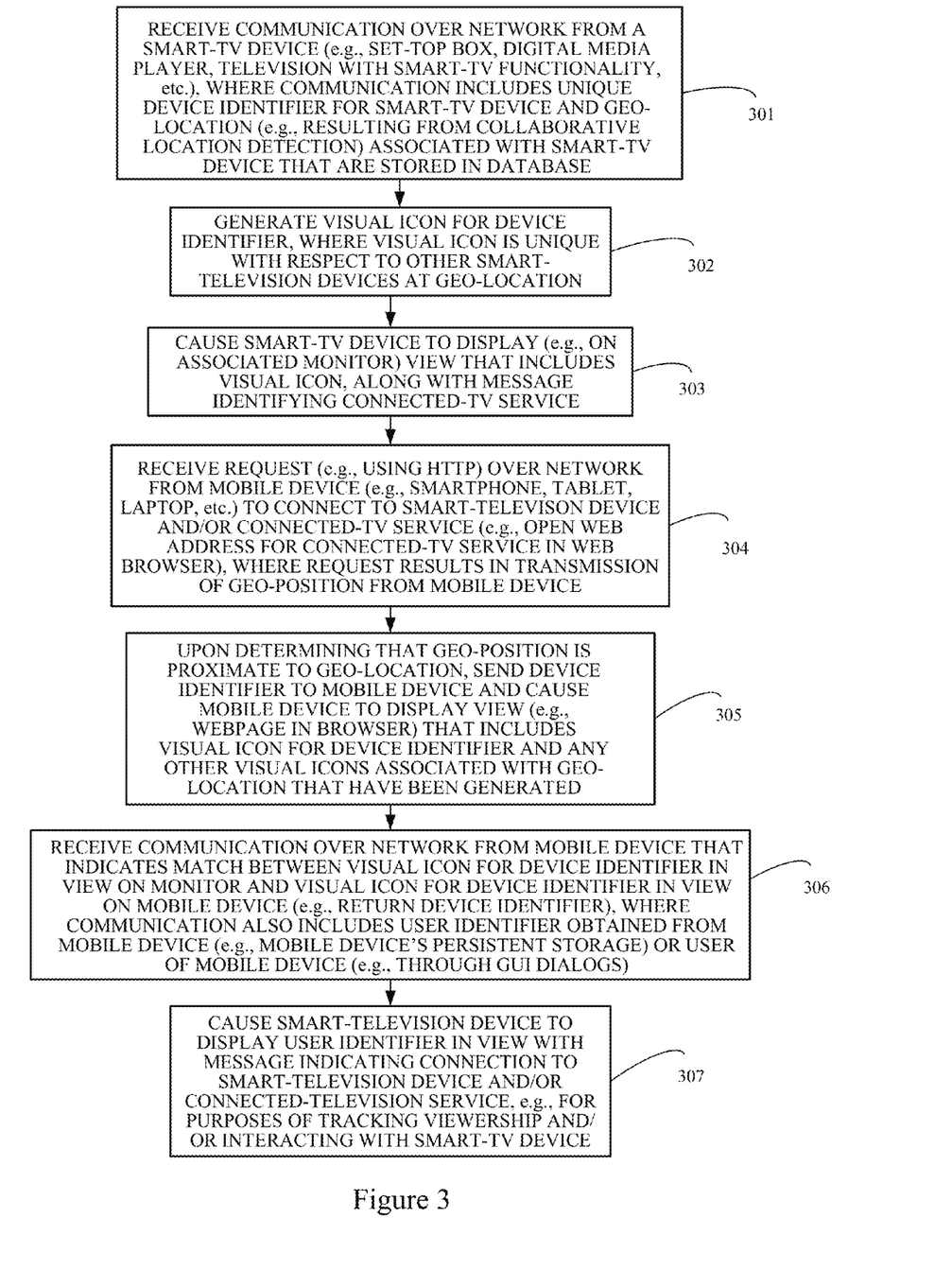
FIG. 3 is a flowchart diagram of a process a process for connecting a mobile device to a smart-television device, in accordance with an example embodiment.

FIG. 3 is a flowchart diagram of a process a process for connecting a mobile device to a smart-television device, in accordance with an example embodiment. It will be appreciated that this figure describes the same process shown in FIG. 2, from the perspective of the software running on the servers at the website. In an example embodiment, all of the operations in this process might be performed by software (e.g., a PHP script) running on those servers. In an alternative example embodiment, some of the operations in this process might be performed by software running on smart-television device 102 and/or mobile device 103 (e.g., an app, a browser plugin, or JavaScript, ActionScript, ECMAScript, etc., as rendered executable by a browser).

As depicted in FIG. 3, the software receives a communication over a network from a smart-television device (e.g., a set-top box, a digital media player/streamer, a television with smart-television functionality, etc.), in operation 301. In an example embodiment, the communication includes a unique device identifier for the smart-television device and a geo-location (e.g., resulting from collaborative location detection as described above) associated with the smart-television device. The software stores the device identifier and the geo-location in a database. In operation 302, the software generates a visual icon for the device identifier. In an example embodiment, the visual icon is unique with respect to other smart-television devices which might also be located at the same approximate geo-location. In operation 303, the software causes the smart-television device to display (e.g., on a monitor associated with the smart-television device) a view that includes the visual icon, along with a message identifying the connected-television service provided by the website. The message might, for example, invite users to connect to the smart-television device so that they can add ratings to be displayed to other users in conjunction with streaming video content such as a live broadcast of a sporting event or concert. In operation 304, the software receives a request (e.g., using hypertext transfer protocol or HTTP) over a network from a mobile device (e.g., smartphone, tablet, laptop, wearable, etc.) to connect to the smart-television device and/or the connected-TV service (e.g., open a web address for the connected-television service in a web browser). The request results in the transmission of the geo-position (e.g., comprising longitude, latitude, and altitude) of the mobile device to the software running on the servers at the website, as described earlier. Then, in operation 305, the software determines that the geo-position of the mobile device is proximate to the geo-location of the smart-television device, as described earlier. The software sends the device identifier to the mobile device and causes the mobile device to display a view (e.g., webpage in browser) that includes the visual icon for the device identifier and any other visual icons associated with the geo-location that have been generated. In operation 306, the software receives a communication over a network from the mobile device that indicates a match between the visual icon for the device identifier in the view on the monitor and the visual icon for the device identifier in the view on the mobile device. For example, the software on the mobile device might return the device identifier to the software at the website, to indicate that a match has occurred. In an example embodiment, the communication to the software at the website might also include a user identifier obtained from the mobile device (e.g., retrieved from the mobile device's persistent storage by a browser plugin or a script rendered executable by a browser) or user of mobile device (e.g., through GUI dialogs). Then in operation 307, the software causes the smart-television device to display the user identifier in a view with a message indicating connection to the smart-television device and/or connected-television service, e.g., for purposes of tracking viewership and/or interacting with the smart-television device (e.g., through a voting app).

In an example embodiment, the connection between the smart-television device and the mobile device might an interactive connection using a protocol such as web sockets. Also, in an example embodiment, the software running on the servers at the website might provide the information for such a connection to the smart-television device and the mobile device and let them set up the connection directly.

As described above in operations 305 and 306, the software on the servers at the website might send the unique identifier for the smart-television device to the software on the mobile device and then have it returned to the software on the servers, if there is a match between the visual icon displayed on the monitor and a visual icon displayed on the touch screen. In another example embodiment, these transmissions of the unique identifier might not occur. For example, the visual icons might have unique identifiers themselves which can be used to indicate a match between the visual icon displayed on the monitor and a visual icon displayed on the touch screen.

Similarly, in an alternative example embodiment, the unique identifier for the smart-television device might not be sent from the software running on the smart-television device. Instead, the unique identifier might be generated by the software running on the servers at the website.

As described above in operations 305 and 306, the user of the mobile device matches a visual icon displayed on the mobile device's touch screen to a visual icon displayed on a monitor. Here again, one might think of this matching as a lightweight form of image-based authentication. In other example embodiments, this matching might be replaced by other lightweight forms of image-based authentication, or by lightweight forms of gesture-based authentication, sound-based authentication, or hybrid authentication (e.g., using one or more image-based authentication, gesture-based authentication, or sound-based authentication). In this regard, it will be appreciated that the determination that the smart-television device is proximate to the mobile device provides a security safeguard, as noted above. That is to say, this determination provides evidence that the connected-television service is not being hacked from a remote location.

Figure 4A:
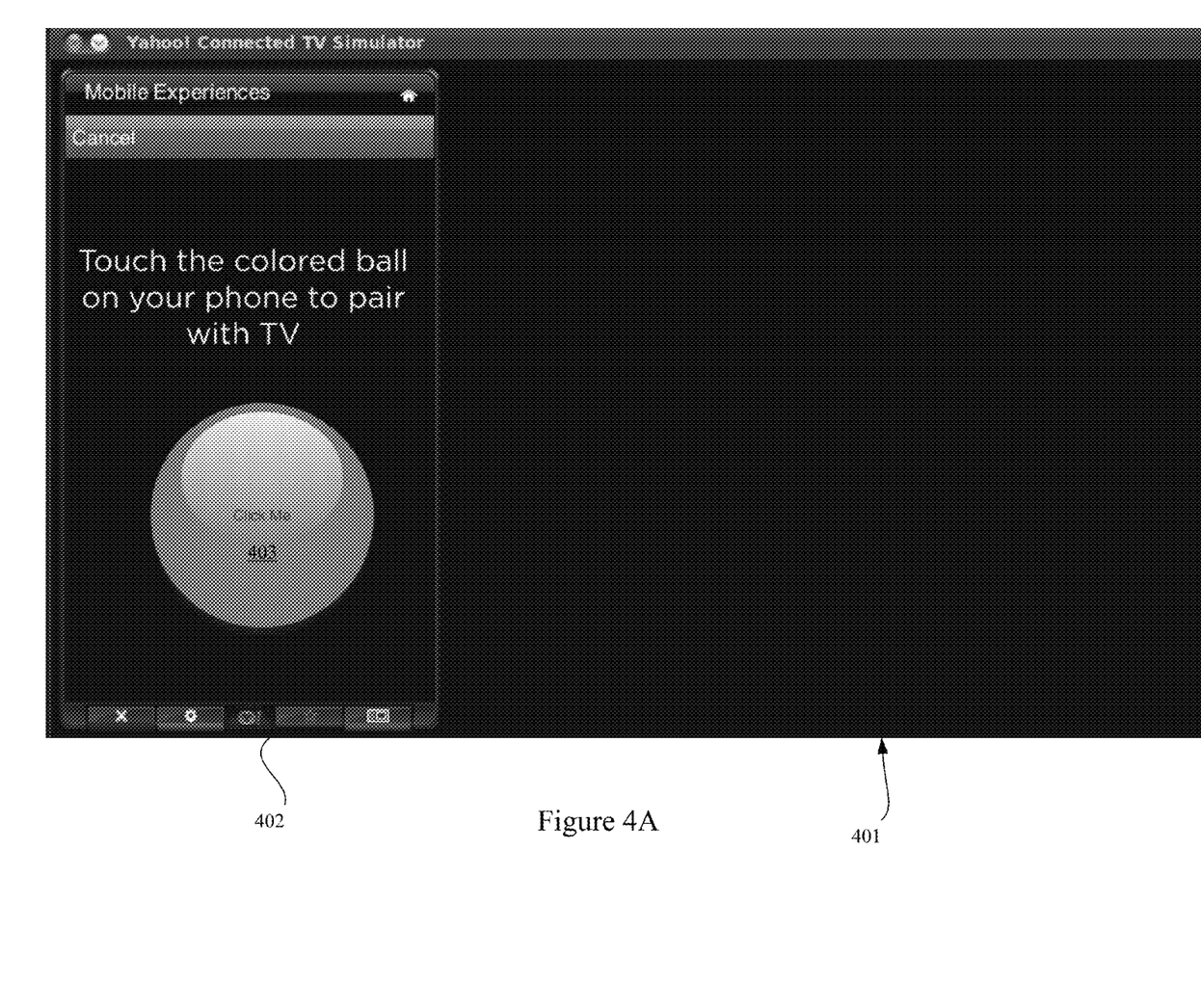
FIG. 4A is a view which might be presented by a smart-television device on a monitor, in accordance with an example embodiment.

FIG. 4A is a view which might be presented by a smart-television device on a monitor, in accordance with an example embodiment. It will be appreciated that this figure might be used with operation 3 in FIG. 2 and operation 303 in FIG. 3. As depicted in FIG. 4A, a monitor 401 displays a view 402 that might have been generated by software running on a smart-television device. As depicted in this figure, view 402 might be a pop-up dialog. In an alternative embodiment, view 402 might be a window that covers more of the monitor 401. View 402 includes a visual icon 403, which is a colored ball. Text above visual icon 403 states: "Touch the colored ball on your phone to pair with TV". And text in the visual icon 403 states: "Click Me", referring to the text above visual icon 403. It will appreciated that, in another example embodiment, visual icon 403 might be a visual icon other than a colored ball, e.g., a trademark associated with the connected-television service. That is to say, visual icon 403 is intended as a non-limiting example of a visual icon that might be used in conjunction with the functionality described in this disclosure.

Figure 4B:
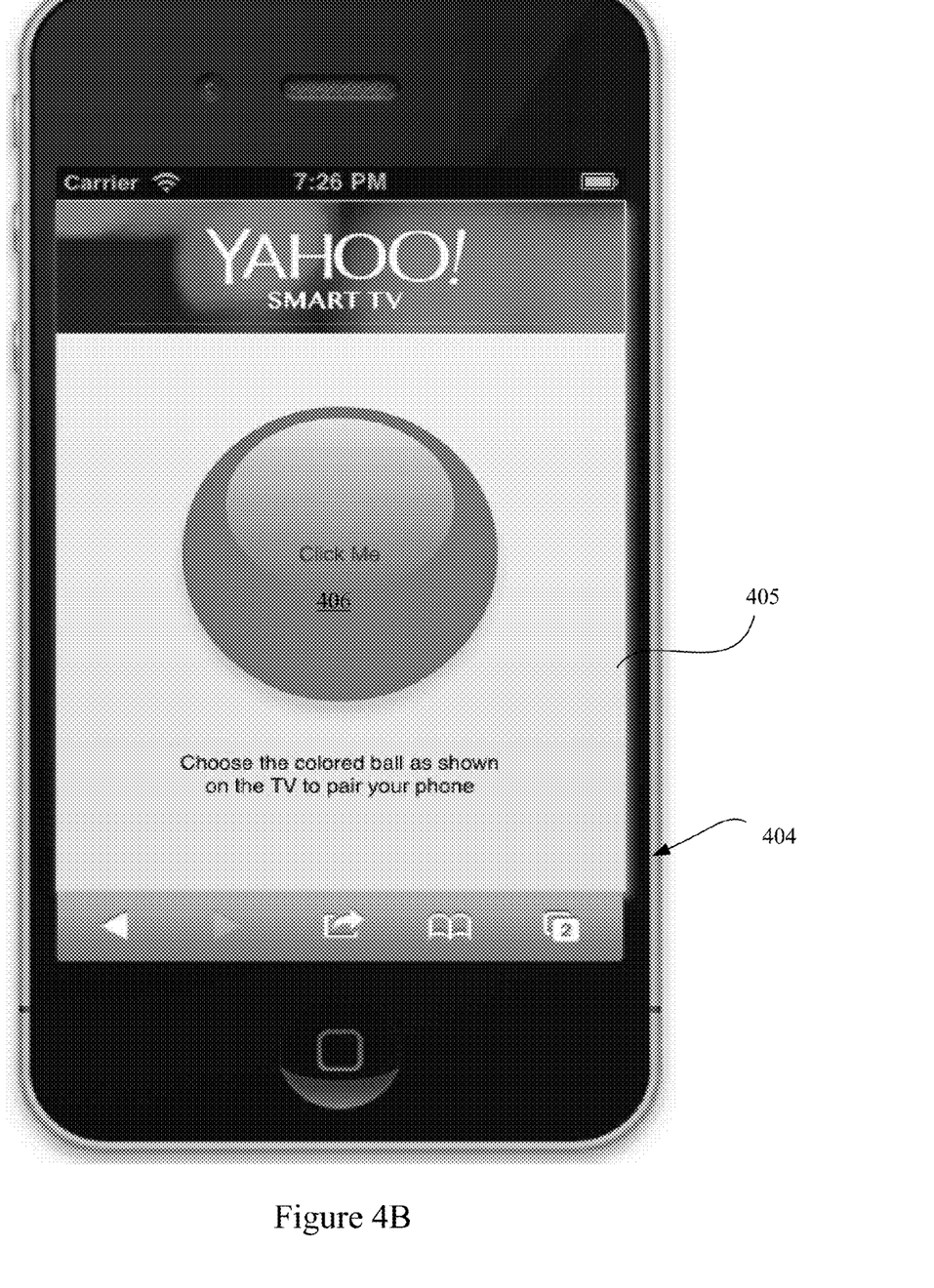
FIG. 4B is a view which might be presented by a mobile device on a touch screen, in accordance with an example embodiment.

FIG. 4B is a view which might be presented by a mobile device on a touch screen, in accordance with an example embodiment. It will be appreciated that this figure might be used with operation 6 in FIG. 2 and operation 305 in FIG. 3. As depicted in FIG. 4B, a touch screen 404 displays a view 405 that might have been generated by software running on the mobile device. As depicted in this figure, view 405 might be a pop-up dialog. In an alternative embodiment, view 405 might be a window that covers more of the touch screen 404. View 405 includes a visual icon 406, which is the same color as the colored ball displayed on monitor 401. Text below visual icon 406 states: "Choose the colored ball as shown on the TV to pair your phone". And text in the visual icon 406 states: "Click Me", referring to the text below visual icon 406. Here again, it will appreciated that, in another example embodiment, visual icon 406 might be a visual icon other than a colored ball, e.g., a trademark associated with the connected-television service. That is to say, visual icon 406 is intended as a non-limiting example of a visual icon that might be used in conjunction with the functionality described in this disclosure.

Figure 4C:
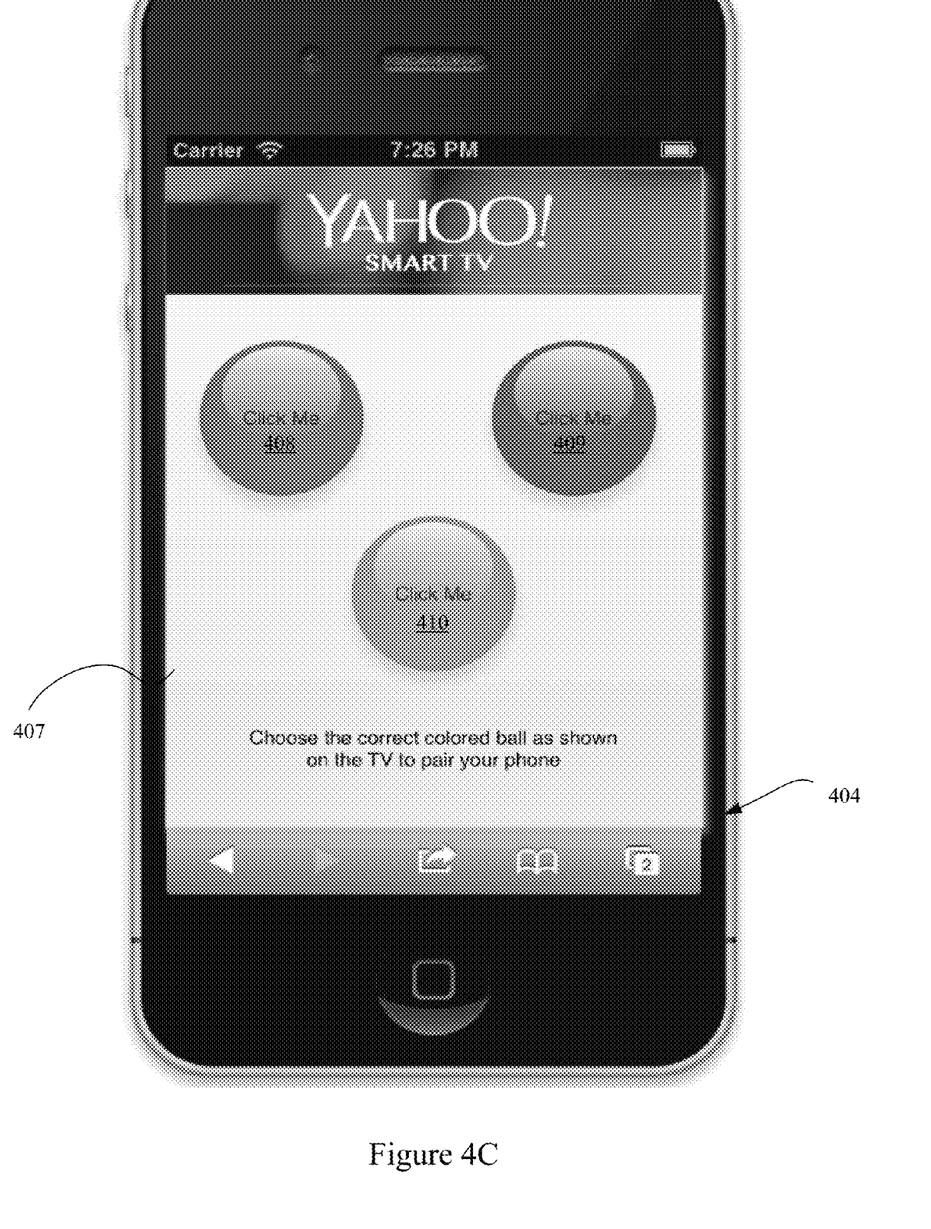
FIG. 4C is another view which might be presented by a mobile device on a touch screen, in accordance with an example embodiment.

FIG. 4C is another view which might be presented by a mobile device on a touch screen, in accordance with an example embodiment. It will be appreciated that this figure might also be used with operation 6 in FIG. 2 and operation 305 in FIG. 3. As depicted in FIG. 4C, a touch screen 404 displays a view 407 that might have been generated by software running on the mobile device. As depicted in this figure, view 407 might be a pop-up dialog. In an alternative embodiment, view 407 might be a window that covers more of the touch screen 404. View 407 also includes visual icon 408, which is the same color as the colored ball displayed on monitor 401, along with visual icons 409 and 410 which are not the same color as the colored ball displayed on monitor 401. It will be appreciated that visual icons 409-410 represent other smart-television devices at the same approximate geo-location as the smart television device associated with monitor 401. Text below the visual icons 408-410 states: "Choose the correct colored ball as shown on the TV to pair your phone". And text in each of the visual icons 408-410 states: "Click Me", referring to the text below the visual icons. Here again, it will appreciated that, in another example embodiment, each of the visual icons 408-410 might be a visual icon other than a colored ball, e.g., a trademark associated with the connected-television service. That is to say, visual icons 408-410 are intended as non-limiting examples of a visual icon that might be used in conjunction with the functionality described in this disclosure.

Figure 4D:
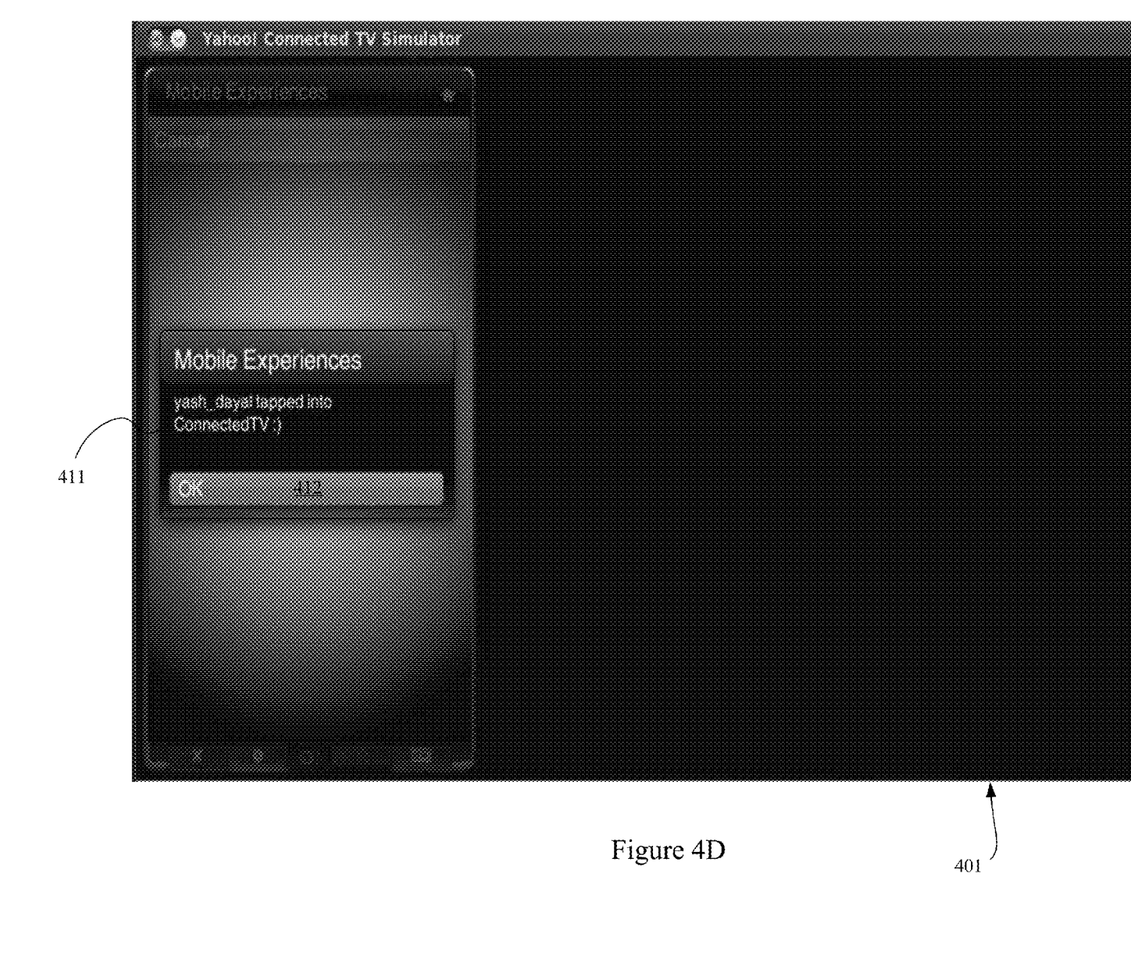
FIG. 4D is another view which might be presented by a smart-television device on a monitor, in accordance with an example embodiment.

FIG. 4D is another view which might be presented by a smart-television device on a monitor, in accordance with an example embodiment. It will be appreciated that this figure might be used with operation 8 in FIG. 2 and operation 307 in FIG. 3. As depicted in FIG. 4D, a monitor 401 displays a view 411 that might have been generated by software running on a smart-television device. As depicted in this figure, view 411 might be a pop-up dialog. In an alternative embodiment, view 411 might be a window that covers more of the monitor 401. View 411 includes an "OK" button (e.g., for closing the pop-up dialog) and text stating: "yash_dayal tapped into ConnectedTV:)". It will be appreciated that this text confirms the connection between the smart-television device associated with monitor 401 and the mobile device displaying the views shown in FIGS. 4B-4C, by displaying the user identifier (e.g., yash_dayal) for the connected-television service received from the mobile device.

In an example embodiment, the connection between the smart-television device and the mobile device might involve the same network, e.g., the same wireless subnet (WiFi). However, one of the advantages of the functionality (e.g., matching geo-location to geo-position) described in this disclosure is that it allows for a connection between a smart-television device on one network (e.g., a wired connection using fiber to the premises) and a mobile device using another network (e.g., 4G or fourth generation mobile telecommunications). It will be appreciated that this advantage: (a) allows multiple mobile-device users using different networks to connect to the same smart-television devices; and (b) allows a single mobile-device user to connect to multiple smart-television devices.

Further, as indicated above, the functionality described in this disclosure might be implemented using a browser on the mobile device, rather than an app. In an example embodiment, the browser might use a plugin distributed by the connected-television service to retrieve the mobile-device's geo-position and/or the user identifier. In an alternative embodiment, the browser might not use a plugin. In that event, a script (such as JavaScript, ActionScript, ECMAScript, etc.) in a web page might be executed to retrieve the mobile-device's geo-position and/or the user identifier.

Further, it will be appreciated that, in an example embodiment, the processes described above might not obtain a password and/or PIN from the user whose user identifier is displayed on the monitor associated with the smart-television device. In that event, the user identifier displayed on the monitor is the user identifier stored on the mobile device, which could be in the hands of a person other than the person associated with the user identifier by the connected-television service. In this example embodiment, the user of the mobile device might not be able to access the full scope of services provided by the connected-television service without providing further evidence of identity, e.g., a password. For example, a user of the mobile device who has not entered a password might be able to add a rating to be displayed to other users in conjunction with streaming video content such as a live broadcast of a sporting event or concert. However, the user of the mobile device might not be allowed to post public comments or to purchase streams and/or downloads without entering a password.

Further, in an example embodiment, the processes described above might be used with open-key cryptography, e.g., to support the transmission of sensitive (or private) data such as passwords and profile information or valuable data such as purchase discounts or coupons. A public key might be generated for each device or user and sent to the devices for use when transmitting some or all of the data (e.g., device identifier, user identifier, password, etc.) described above.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the website might host an online retailer or an online publication, instead of a connected-television service. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising the operations of:
receiving a communication over a network from a smart-television device, wherein the communication includes a device identifier, which is unique, for the smart-television device and a geo-location for the smart-television device, wherein the geo-location results at least in part from collaborative location detection that uses stored geo-positions previously received from one or more mobile devices positioned proximate to the smart-television device;
causing the smart-television device to display a first view that includes a visual icon and a message identifying a connected-television service;
receiving a geo-position for a mobile device;
upon determining that the geo-location of the smart-television device is proximate to the geo-position of the mobile device, causing the mobile device to display a second view that includes the visual icon;
receiving a communication over the network from the mobile device that indicates a match between the visual icon in the first view and the visual icon in the second view; and
causing the smart-television device to display a third view with a message indicating connection to the smart-television device, wherein each of the operations is executed by one or more processors.

2. The method of claim 1, wherein the collaborative location detection is performed by the smart-television device.

3. The method of claim 2, wherein the collaborative location detection uses a statistical measure of central tendency.

4. The method of claim 1, further comprising an operation of:
sending the device identifier to the mobile device.

5. The method of claim 4, wherein the communication that indicates a match between the visual icons returns the device identifier.

6. The method of claim 1, wherein the device identifier is provided by a manufacturer of the smart-television device.

7. The method of claim 1, wherein the visual icon is unique with respect to other smart-television devices at the geo-location.

8. The method of claim 1, wherein the second view includes any other visual icons associated with the location that have been generated.

9. The method of claim 1, wherein the geo-location identifies at least the latitude, longitude, and altitude of the smart-television device.

10. One or more computer-readable media that are non-transitory and that store a program, wherein the program, when executed, instructs a processor to perform the following operations:
- receive a communication over a network from a smart-television device, wherein the communication includes a device identifier, which is unique, for the smart-television device and a geo-location for the smart-television device, wherein the geo-location results at least in part from collaborative location detection that uses stored geo-positions previously received from one or more mobile devices positioned proximate to the smart-television device and wherein the collaborative location detection uses a statistical measure of central tendency;
- cause the smart-television device to display a first view that includes a visual icon and a message identifying a connected-television service;
- receive a geo-position for a mobile device;
- upon determining that the geo-location of the smart-television device is proximate to the geo-position of the mobile device, cause the mobile device to display a second view that includes the visual icon;
- receive a communication over the network from the mobile device that indicates a match between the visual icon in the first view and the visual icon in the second view; and
- cause the smart-television device to display a third view with a message indicating connection to the smart-television device, wherein each of the operations is executed by one or more processors.

11. The computer-readable media of claim 10, wherein the collaborative location detection is performed by the smart-television device.

12. The computer-readable media of claim 11, wherein the collaborative location detection uses a statistical measure of central tendency.

13. The computer-readable media of claim 10, further comprising an operation of:
- send the device identifier to the mobile device.

14. The computer-readable media of claim 13, wherein the communication that indicates a match between the visual icons returns the device identifier.

15. The computer-readable media of claim 10, wherein the device identifier is provided by a manufacturer of the smart-television device.

16. The computer-readable media of claim 10, wherein the visual icon is unique with respect to other smart-television devices at the geo-location.

17. The computer-readable media of claim 10, wherein the second view includes any other visual icons associated with the location that have been generated.

18. The computer-readable media of claim 10, wherein the geo-location identifies at least the latitude, longitude, and altitude of the smart-television device.

19. A method, comprising the operations of:
- receiving a communication over a network from a smart-television device, wherein the communication includes a device identifier, which is unique, for the smart-television device and a geo-location for the smart-television device, wherein the geo-location results at least in part from collaborative location detection that uses stored geo-positions previously received from one or more mobile devices positioned proximate to the smart-television device and wherein the collaborative location detection uses a statistical measure of central tendency;
- causing the smart-television device to display a first view that includes a visual icon and a message identifying a connected-television service;
- receiving a geo-position for a mobile device;
- upon determining that the geo-location of the smart-television device is proximate to the geo-position of the mobile device, causing the mobile device to display a second view that includes the visual icon;
- receiving a communication over the network from the mobile device that indicates a match between the visual icon in the first view and the visual icon in the second view; and
- causing the smart-television device to display a third view with a message indicating connection to the smart-television device, wherein each of the operations is executed by one or more processors.

20. The method of claim 19, wherein the collaborative location detection is performed by the smart-television device.

* * * * *